United States Patent
Liu et al.

(10) Patent No.: US 11,310,232 B2
(45) Date of Patent: Apr. 19, 2022

(54) NETWORK IDENTITY AUTHENTICATION METHOD AND SYSTEM, AND USER AGENT DEVICE USED THEREBY

(71) Applicant: GUANGDONG UNIVERSITY OF TECHNOLOGY, Guangdong (CN)

(72) Inventors: Wenyin Liu, Guangdong (CN); Xin Li, Guangdong (CN); Zhiheng Shen, Guangdong (CN); Jialong Zhang, Guangdong (CN); Shuai Fan, Guangdong (CN); Qixiang Zhang, Guangdong (CN); Jiahong Wu, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 287 days.

(21) Appl. No.: 16/490,071

(22) PCT Filed: Sep. 25, 2018

(86) PCT No.: PCT/CN2018/107244
§ 371 (c)(1),
(2) Date: Aug. 29, 2019

(87) PCT Pub. No.: WO2019/095856
PCT Pub. Date: May 23, 2019

(65) Prior Publication Data
US 2020/0014686 A1 Jan. 9, 2020

(30) Foreign Application Priority Data
Nov. 16, 2017 (CN) .......................... 201711139380.7

(51) Int. Cl.
*H04L 29/06* (2006.01)

(52) U.S. Cl.
CPC ........ *H04L 63/0884* (2013.01); *H04L 63/083* (2013.01); *H04L 63/0861* (2013.01); *H04L 63/1483* (2013.01); *H04L 63/20* (2013.01)

(58) Field of Classification Search
None
See application file for complete search history.

(56) References Cited

U.S. PATENT DOCUMENTS 5,784,463 A * 7/1998 Chen ....................... G06F 21/33
380/282
5,790,785 A * 8/1998 Klug ....................... G06F 21/41
726/11

(Continued)

FOREIGN PATENT DOCUMENTS

| CN | 104270338 A | 1/2015 |
| CN | 105827597 A | 8/2016 |

(Continued)

OTHER PUBLICATIONS

International Search Report for PCT/CN2018/107244 dated Dec. 14, 2018, ISA/CN.

*Primary Examiner* — Piotr Poltorak
(74) *Attorney, Agent, or Firm* — Yue (Robert) Xu; Apex Attorneys at Law, LLP

(57) ABSTRACT

There are provided a network identity authentication method, a network identity authentication system, a user agent device used in the network identity authentication method and the network identity authentication system, and a computer-readable storage medium. The network identity authentication method includes: acquiring, by a user agent, identity information and a registration rule of a target website via a network terminal; acquiring registration information for the target website based on the identity information or generating registration information for the target website according to the registration rule; transmitting the (Continued)

identity information and the registration information to a server agent and sending, by the server agent based on the identity information and the registration information, an authentication request to a website server to complete an authentication process.

13 Claims, 7 Drawing Sheets

(56) References Cited

U.S. PATENT DOCUMENTS

| | | | | |
|---|---|---|---|---|
| 6,496,855 | B1* | 12/2002 | Hunt | G06F 21/31 |
| | | | | 709/202 |
| 7,797,413 | B2* | 9/2010 | Adelman | H04L 65/1079 |
| | | | | 709/223 |
| 8,402,525 | B1* | 3/2013 | Shah | H04L 63/10 |
| | | | | 726/8 |
| 2002/0146018 | A1* | 10/2002 | Kailamaki | H04L 69/329 |
| | | | | 370/401 |
| 2008/0288781 | A1* | 11/2008 | Lawson | G06F 21/31 |
| | | | | 713/182 |
| 2009/0070598 | A1* | 3/2009 | Cromer | G06F 21/575 |
| | | | | 713/193 |

FOREIGN PATENT DOCUMENTS

| | | | |
|---|---|---|---|
| CN | 107809438 | A | 3/2018 |
| EP | 1482707 | A1 | 12/2004 |
| WO | 0171973 | A1 | 9/2001 |

* cited by examiner

NETWORK IDENTITY AUTHENTICATION METHOD AND SYSTEM, AND USER AGENT DEVICE USED THEREBY

The present application is the national phase of PCT International Patent Application PCT/CN2018/107244, filed on Sep. 25, 2018, which claims priority to Chinese Patent Application No. 201711139380.7, titled "NETWORK IDENTITY AUTHENTICATION METHOD AND SYSTEM, AND USER AGENT DEVICE USED THEREBY", filed on Nov. 16, 2017 with the Chinese Patent Office, both of which are incorporated herein by reference in their entireties.

FIELD

The present disclosure relates to the technical field of information security, and in particular to a network identity authentication method, a network identity authentication system, a user agent device used in the network identity authentication method and the network identity authentication system, and a computer-readable storage medium.

BACKGROUND

With the development of the Internet and increase of user demands, increasing network space brings convenience for people, while bringing dangers to personal security, national security and social stability. A conventional network identity authentication management mechanism based on "username and password" of the character type becomes a mainstream network identity authentication management mechanism due to simple operation, high reliability, easy deployment and low cost.

Each user may register multiple network identities respectively on multiple websites and manage the multiple network identities. In this case, severe network security threats such as password fatigue, phishing, and credential stuffing attacks may be caused.

For example, a user registers network identities respectively on multiple websites, and different usernames and passwords are required for different network identities to improve security. In this case, the user has to remember a large number of usernames and passwords, which may result in confusion of the usernames and the passwords, and thus results in poor user experience. This is so-called password fatigue.

In addition, most users may use identical or similar usernames with sharing a same password for convenience, which may easy to be remembered but results in low security. Once a certain account is stolen, all accounts may be leaked. A hacker may attempt to use leaked identity information or a commonly used password to perform login to illegally acquire lots of user network identity information. This is so-called credential stuffing attacks.

Therefore, it is desirable to improve security in network identity authentication without causing the password fatigue.

SUMMARY

An object of the present disclosure is to provide a network identity authentication method, a network identity authentication system, a user agent device used in the network identity authentication method and the network identity authentication system, and a computer-readable storage medium, to improve security in network identity authentication without causing password fatigue.

In order to achieve the above object, a network identity authentication method is provided according to an embodiment of the present disclosure. The network identity authentication method includes:
acquiring, by a user agent, identity information and a registration rule of a target website via a network terminal;
acquiring registration information for the target website based on the identity information or generating registration information for the target website according to the registration rule;
transmitting the identity information and the registration information to a server agent; and
sending, by the server agent based on the identity information and the registration information, an authentication request to a website server to complete an authentication process.

The sending, by the server agent based on the identity information and the registration information, an authentication request to a website server to complete an authentication process includes:
transmitting, by the server agent, the identity information and the registration information to the network terminal; and
sending, by the network terminal based on the identity information and the registration information, the authentication request to the website server to complete the authentication process.

The sending, by the server agent based on the identity information and the registration information, an authentication request to a website server to complete an authentication process includes:
transmitting, by the server agent, the identity information and the registration information directly to the website server to complete the authentication process.

Before acquiring, by a user agent, identity information and a registration rule of a target website via a network terminal, the network identity authentication method further includes:
activating the user agent by inputting a master password for the user agent.

Before acquiring, by a user agent, identity information and a registration rule of a target website via a network terminal, the network identity authentication method further includes:
activating the user agent by inputting a biometric feature.

The identity information includes a website address and session information of the target website.

The acquiring, by a user agent, identity information and a registration rule of a target website via a network terminal includes:
acquiring the identity information and the registration rule by the server agent based on the target website that is requested to be displayed by the network terminal;
generating a two-dimensional code by the server agent based on the identity information and the registration rule;
acquiring, by the network terminal, the two-dimensional code from the server agent; and
scanning, by the user agent, the two-dimensional code to establish a secure connection with the server agent; and
acquiring, by the user agent, the identity information and the registration rule of the target website from the server agent via the secure connection.

The acquiring, by a user agent, identity information and a registration rule of a target website via a network terminal includes:

establishing, by the user agent, a secure connection with the server agent;

acquiring the identity information and the registration rule by the server agent based on the target website that is requested to be displayed by the network terminal; and transmitting, by the server agent, the identity information and the registration rule of the target website to the user agent via the secure connection, when a user clicks on a predetermined position in a page displayed on the network terminal.

After acquiring, by a user agent, identity information and a registration rule of a target website via a network terminal, the network identity authentication method further includes:

determining, by the user agent based on the identity information, whether the target website is a phishing website, where if it is determined that the target website is not a phishing website, the step of acquiring registration information for the target website based on the identity information or generating registration information for the target website according to the registration rule is performed.

Before sending, by the server agent based on the identity information and the registration information, an authentication request to a website server to complete an authentication process, the network identity authentication method further includes:

determining, by the server agent, whether a received request including the authentication request is an illegal request or a malicious request, where if it is determined that the received request is neither an illegal request nor a malicious request, the step of sending, by the server agent based on the identity information and the registration information, an authentication request to a website server to complete an authentication process is performed.

The acquiring registration information for the target website based on the identity information or generating registration information for the target website according to the registration rule includes:

inquiring, based on the identity information, whether history registration information for the target website exists in an identity information table; and determining the history registration information as the registration information for the target website if the history registration information for the target website exists in the identity information table, or generating the registration information for the target website according to the registration rule if no history registration information for the target website exists in the identity information table.

The network identity authentication method further includes:

establishing, by the user agent, a secure connection with the server agent;

acquiring, by the user agent via the secure connection, identity information of a to-be-modified website;

inquiring history registration information for the to-be-modified website by the user agent based on the identity information, and modifying the history registration information by the user agent;

sending, by the user agent based on the identity information and the modified registration information, a registration information modifying request to the website server via the server agent; and modifying, by the website server based on the modified registration information, registration information for the to-be-modified website, and transmitting, by the website server, a modifying result to the network terminal.

In order to achieve the above object, a network identity authentication system is provided according to an embodiment of the present disclosure. The network identity authentication system includes: an acquisition module, a generation module and an authentication module. The acquisition module is configured for a user agent to acquire identity information and a registration rule of a target website via a network terminal. The generation module is configured to acquire registration information for the target website based on the identity information or generate registration information for the target website according to the registration rule. The authentication module is configured to transmit the identity information and the registration information to a server agent, so that the server agent sends, based on the identity information and the registration information, an authentication request to a website server to complete an authentication process.

The authentication module is configured for the server agent to transmit the identity information and the registration information to the network terminal, so that the network terminal sends, based on the identity information and the registration information, the authentication request to the website server to complete the authentication process.

The authentication module is configured for the server agent to transmit the identity information and the registration information directly to the website server to complete the authentication process.

In order to achieve the above object, a user agent device is provided according to an embodiment of the present disclosure. The user agent device includes a memory and a processor. The memory is configured to store a network identity authentication program. The processor is configured to execute the network identity authentication program to perform the network identity authentication method described above.

In order to achieve the above object, a computer-readable storage medium is provided according to an embodiment of the present disclosure. The computer-readable storage medium has stored thereon a network identity authentication program. When executed by a processor, the network identity authentication program causes the processor to perform the network identity authentication method described above.

It can be seen from the above that, the network identity authentication method according to the embodiment of the present disclosure includes: acquiring, by a user agent, identity information and a registration rule of a target website via a network terminal; acquiring registration information for the target website based on the identity information or generating registration information for the target website according to the registration rule; transmitting the identity information and the registration information to a server agent; and sending, by the server agent based on the identity information and the registration information, an registration request to a website server to complete an authentication process.

With the network identity authentication method according to the embodiment of the present disclosure, the user agent may automatically generate, for a user, different usernames and passwords for to-be-registered target websites, and the user is not required to remember these usernames and passwords. Further, when the user registers or logs in the target website, the server agent transmits registration information including a username and a password directly to the website server to complete the authentication process, without downloading an application program from the target website, thereby avoiding credential stuffing attacks due to similar usernames and passwords. It can be seen that, with the network identity authentication method according to the embodiment of the present disclosure, security in network identity authentication can be improved without causing the password fatigue. A network identity authentication system, a user agent device used in the network identity authentication method and the network identity authentication system, and a computer-readable storage medium are further provided in the present disclosure, which have the same technical effect as the network identity authentication method.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF THE EMBODIMENTS

Technical solutions in embodiments of the present disclosure are clearly and completely described below in conjunction with the drawings in the embodiments of the present disclosure. It is apparent that the embodiments described herein are only some embodiments of the present disclosure, rather than all the embodiments. All other embodiments obtained by those skilled in the art based on the embodiments of the present disclosure without any creative work fall into the protection scope of the present disclosure.

A network identity authentication method is provided according to an embodiment of the present disclosure, to improve security in network identity authentication without causing password fatigue.

Figure 1:
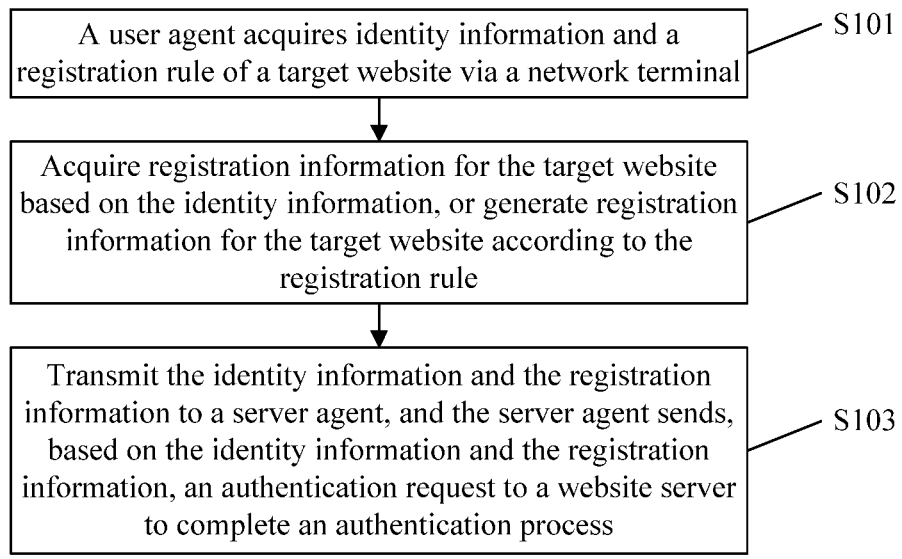
FIG. 1 is a flowchart showing a network identity authentication method according to an embodiment of the present disclosure.

Reference is made to FIG. 1, which is a flowchart showing a network identity authentication method according to an embodiment of the present disclosure. As shown in FIG. 1, the network identity authentication method includes the following steps S101 to S103.

In S101, a user agent acquires identity information and a registration rule of a target website via a network terminal.

The identity information and the registration rule of the target website are acquired, so as to automatically generate registration information for the target website according to the registration rule in a subsequent step. The registration information may include a username and a password that are used to login the target website. The target website may be accessed by using the identity information and the registration information.

The network terminal acquires the identity information and the registration rule of the target website via a website server, and transmits the identity information and the registration rule to the user agent. The identity information includes a website address and session information of the target website.

It should be appreciated that the user agent may acquire the identity information and the registration rule of the target website in various ways, which is not limited herein and may be selected flexibly by those skilled in the art according to actual situations. For example, a server agent acquires the identity information and the registration rule of the target website based on the target website that is requested to be displayed by the network terminal, and the server agent generates a corresponding two-dimensional code automatically or when a user clicks on an input box. The two-dimensional code is transmitted to the network terminal and is displayed on the network terminal. The user agent scans the two-dimensional code to establish a secure connection with the server agent, and the user agent acquires the identity information and the registration rule of the target website from the server agent via the secure connection.

For another example, a secure connection is firstly established between the user agent and the server agent. The server agent acquires the identity information and the registration rule of the target website based on the target website that is requested to be displayed by the network terminal. When a user clicks on an input box in a page displayed on the network terminal, the server agent transmits the identity information and the registration rule of the target website to the user agent via the secure connection.

It should be noted that, in the above examples, the secure connection may be established in various ways, which is not limited herein. For example, the user agent may establish the secure connection with the server agent by logging in the server agent. For another example, the server agent acquires identity information of the target website based on the target website that is requested to be displayed by the network terminal, and the server agent generates a unique session identifier (session ID) and a two-dimensional code including the unique session identifier. The user agent acquires the unique session identifier by scanning the two-dimensional code and transmits the unique session identifier to the server agent. The server agent verifies the received unique session identifier. If the verification is successful, a secure connection is established between the user agent and the server agent.

The user agent is a computer system which is trusted by a user and assists the user in automatically generating account information. It should be noted that, each user may authorize multiple user agents, but each user agent serves only one user.

In this step, it is considered that the user agent has been authorized and activated by the user. The user may activate the agent user in various ways, which is not limited herein. For example, the user may set a master password for the user agent, and the user may activate the user agent by inputting the master password. For another example, the user may activate the user agent by inputting an authorized biometric feature, where the biometric feature may include iris information, fingerprint information and voice information of the user, or the like, which is not limited herein.

After the user agent acquires the identity information and the registration rule of the target website via the network terminal, the network identity authentication method further includes a step of determining whether the target website is a phishing website based on the identity information. Whether the target website is a phishing website may be determined by those skilled in the art in various ways, all of which fall within the protection scope of the embodiments of the present disclosure. For example, a feature vector of the target website may be extracted by a feature extractor, and the extracted feature vector is inputted in a trained classifier and is classified by the classifier. Then it is determined whether the target website is a phishing website. If it is determined that the target website is a phishing website, an alarm prompt may be transmitted to the user via the network terminal. It should be appreciated that the alarm prompt may be presented in various forms, for example, by popping up a prompt dialog box or playing an audio, which is not limited herein.

In S102, registration information for the target website is acquired based on the identity information, or registration information for the target website is generated according to the registration rule.

The user agent may automatically generate the account information (i.e., the username and the password) for the user. The website server is required to inform the user agent about information (such as an e-mail address and a phone number) required for registration and a setting rule for the username and the password in a predetermined format (for example, in JSON). If necessary, the user agent may acquire the required information (which may include serial numbers of software and hardware of the user agent, and the like) from other sources based on requirements of a server side, and the user agent generates the username and the password based on the information according to the rule required by the server, so as to form the required registration information for the target website along with other information provided by the user (where the information may also include other information automatically acquired by the user agent).

It should be noted that the user may also manage a registered network identity of the user. The registered network identity information of the user, i.e., a username and a password for a registered website, may be stored in the user agent. The user may add a newly-registered account or cancel a previously-registered account at any time, and synchronous backup may be achieved between the cloud and multiple user agents.

Before the registration information is generated, the user agent may find registered network identity information of the user for the target website based on the identity information, and the method directly proceeds to step S103, so as to complete a login authentication process. Further, even though the user agent finds one or more pieces of history registration information for the target website, the user may still select to generate new registration information for the target website according to the registration rule, and then the method proceeds to step S103, so as to complete a registration authentication process.

In S103, the identity information and the registration information are transmitted to a server agent, and the server agent sends, based on the identity information and the registration information, an authentication request to a website server to complete an authentication process.

The server agent plays a role in transmitting the authentication request to the website server. The authentication request may be a registration request or a login request. Therefore, before generating the registration information for the target website according to the registration rule, the network identity authentication method further includes a step of inquiring, based on the identity information, whether history registration information for the target website exists in an identity information table. If the history registration information for the target website exists in the identity information table, the history registration information is determined as login information for the target website, and the identity information and the history registration information are transmitted to the server agent, so that the server agent sends, based on the identity information and the history registration information, the login request to the website server, to complete the authentication process. If no history registration information for the target website exists in the identity information table, the registration information for the target website is generated according to the registration rule.

It should be appreciated that the user may automatically modify the history registration information in the identity information table via the user agent at any time. The user agent firstly establishes a secure connection with the server agent, and the user agent acquires, via the secure connection, identity information of a to-be-modified website. The user agent inquires history registration information for the to-be-modified website based on the identity information and automatically modifies the history registration information according to the registration rule. The user agent transmits the identity information and the modified registration information to the website server via the server agent. After the website server modifies registration information for the to-be-modified website, the website server informs the network terminal about whether the registration information is modified successfully. It should be noted that, the secure connection herein is established in the same way as that described above, which is not repeated herein.

Before the server agent sends, based on the identity information and the registration information, the authentication request to the website server to complete the authentication process, the network identity authentication method further includes a step of determining whether a received request including the authentication request is an illegal request or a malicious request. If it is determined that the registration request is an illegal request or a malicious request, an alarm prompt may be transmitted to an administrator. It should be appreciated that the alarm prompt may be presented in various forms, for example, by popping up a prompt dialog box or playing an audio, which is not limited herein. If it is determined that the registration request is neither an illegal request nor a malicious request, the server agent sends, based on the identity information and the registration information, the registration request to the website server to complete the authentication process.

It should be appreciated that, the malicious request may be detected in various ways, which is not limited herein. For example, the received request is detected based on a rule set that is summarized in advance or by using a classifier that is trained by a machine learning algorithm. The server agent firstly checks and filters out requests such as a registration request or a login request from the user agent, to improve server efficiency and reduce server stress. For some websites (for example, "12306") for which the login request is frequently sent, some users may make an illegal action (such as ticket purchasing of a ticket scalper) by logging in the website frequently or registering multiple accounts. In addition, an attacker may frequently attempt to login the website to perform "credential stuffing attacks". In these cases, the server agent may receive a large number of requests such as registration requests and login requests from the user agent in a short time period. Information source parameters carried by the requests are analyzed to determine whether the requests are transmitted from a same user agent. If the server agent determines that a certain user agent requests to login an account at the site server or create a new account for multiple times during a certain time period, the server agent may automatically filter out all requests transmitted from the user agent and temporarily enforce a ban on the user agent. The registration requests and the login requests transmitted via the server agent are considered as legal and valid by the website server, and are each responded and processed by the website server. Results of the processed requests are fed back to the user agent and the network terminal, for a subsequent process of the user.

It can be seen that, in a case that the server agent performs the function of monitoring and filtering out malicious registration and login requests, a verification code is not required, so that user experience can be improved during the registration and login. When the website server is attacked, the server agent may automatically take protective measures (for example, temporarily ban related network identities or all network identities from logging in, or ask for more authentication information) and inform the administrator and the user to take related measures (for example, modify the password).

It should be noted that the server agent may be deployed on a side of the website server or a side of the network terminal. In a case that the server agent is deployed on the side of the website server, the server agent is in close connection with the website server and may transmit the identity information of the target website and the registration information for the target website directly to the website server to complete the authentication process. In a case that the server agent is deployed on the side of the network terminal, the server agent is required to firstly establish a secure connection with the user agent, and the user agent transmits the identity information of the target website and the registration information for the target website to the server agent via the secure connection. The server agent transmits the identity information of the target website and the registration information for the target website to the network terminal, and the network terminal sends the authentication request to the website server to complete the authentication process.

With the network identity authentication method according to the embodiment of the present disclosure, the user agent may automatically generate, for a user, different usernames and passwords for to-be-registered target websites, and the user is not required to remember these usernames and passwords. Further, when the user registers or logs in the target website, the server agent transmits registration information including a username and a password directly to the website server to complete the authentication process, without downloading an application program from the target website, thereby avoiding credential stuffing attacks due to similar usernames and passwords. It can be seen that, with the network identity authentication method according to the embodiment of the present disclosure, security in network identity authentication can be improved without causing the password fatigue.

A network identity authentication method is provided according to an embodiment of the present disclosure. Based on the above embodiment, Implementations of the network identity authentication method are described below.

Figure 2:
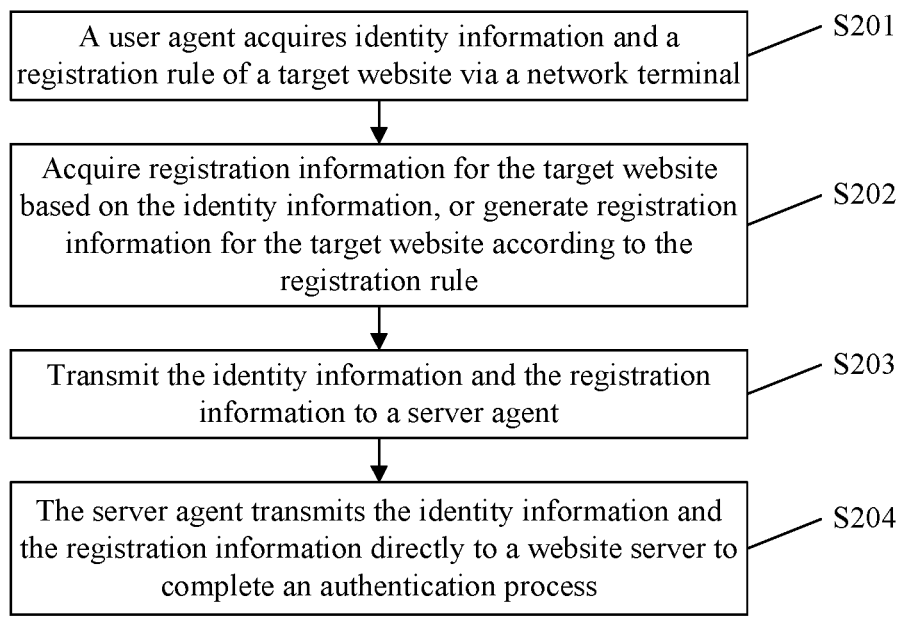
FIG. 2 is a flowchart showing a network identity authentication method according to another embodiment of the present disclosure.

Reference is made to FIG. 2, which is a flowchart showing a network identity authentication method according to another embodiment of the present disclosure. As shown in FIG. 2, the network identity authentication method includes the following steps S201 to S204.

In S201, a user agent acquires identity information and a registration rule of a target website via a network terminal.

In S202, registration information for the target website is acquired based on the identity information, or registration information for the target website is generated according to the registration rule.

In S203, the identity information and the registration information are transmitted to a server agent.

In S204, the server agent transmits the identity information and the registration information directly to a website server to complete an authentication process.

Figure 3:
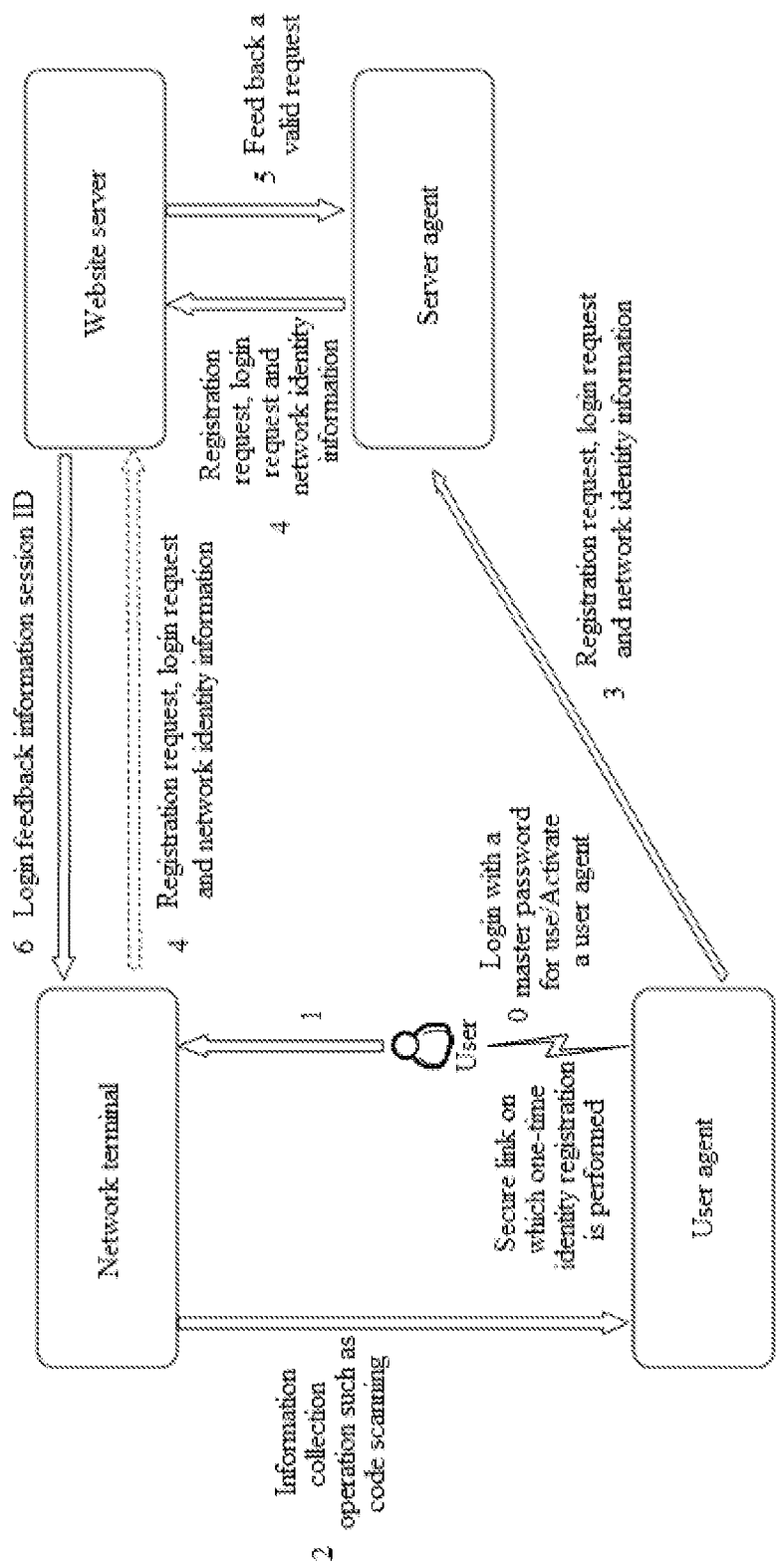
FIG. 3 is a schematic structural diagram showing a first implementation of the network identity authentication method according to the embodiments of the present disclosure.
Figure 4:
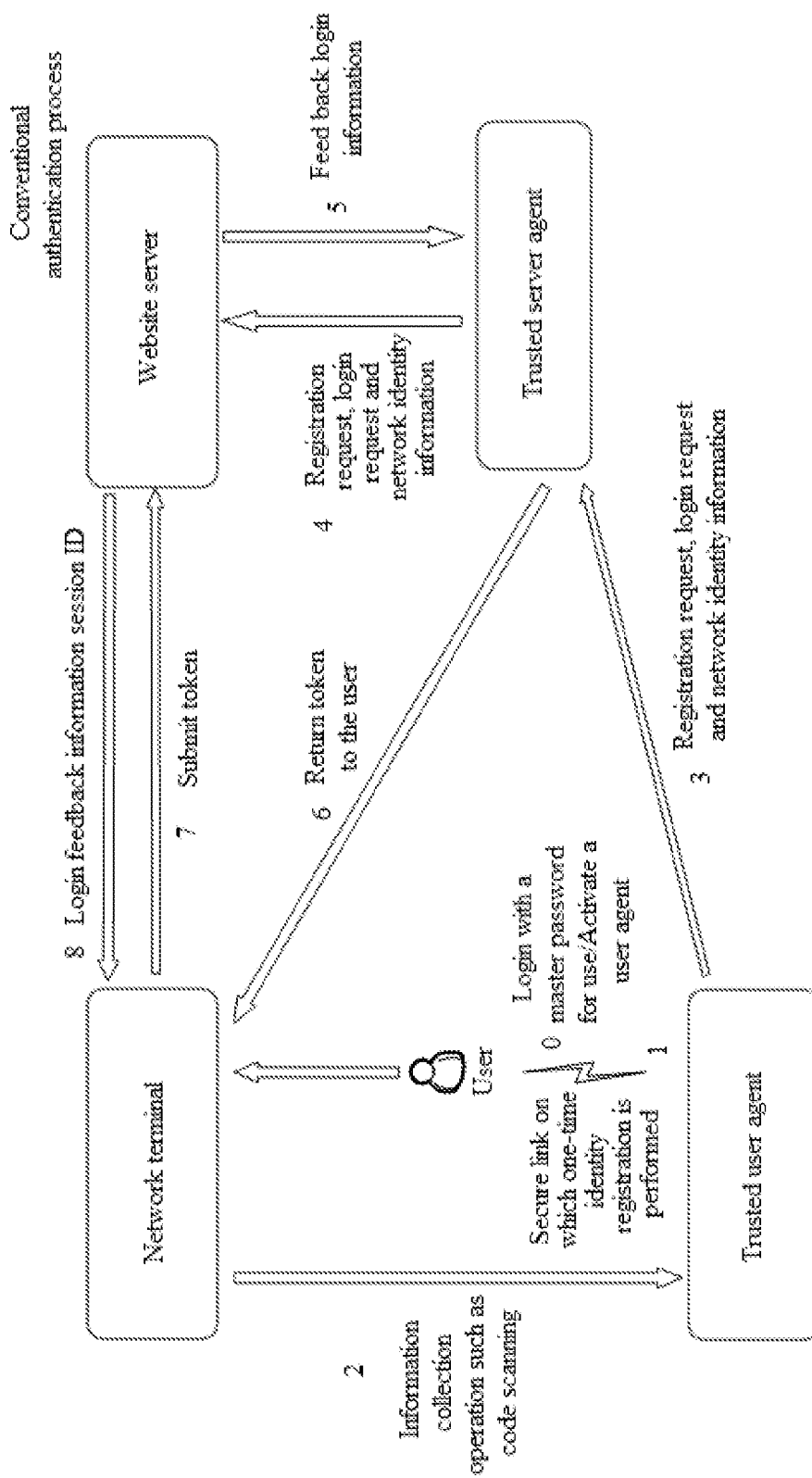
FIG. 4 is a schematic structural diagram showing a second implementation of the network identity authentication method according to the embodiments of the present disclosure.

The server agent may be deployed on the side of the website server. In this case, the server agent is in close connection with the website server, and the server agent transmits the identity information of the target website and the registration information for the target website directly to the website server to complete the authentication process. As shown in FIG. 3, after the website server completes the authentication, the website server may return a valid request to the server agent, and may return login feedback information (session ID) to the network terminal to establish a connection between the network terminal and the website server. In another implementation, as shown in FIG. 4, the website server may generate a token for the user based on the registration information, and may transmit the token to the network terminal via the server agent. It should be appreciated, that the taken is in one-to-one mapping with user information in the registration information, that is, each user corresponds to one token. The network terminal transmits the token received from the server agent to the website server. After the website server completes the authentication, the user logs in successfully. The website server returns login feedback information (session ID) to establish the connection.

Another implementation of the network identity authentication method is described below.

Figure 5:
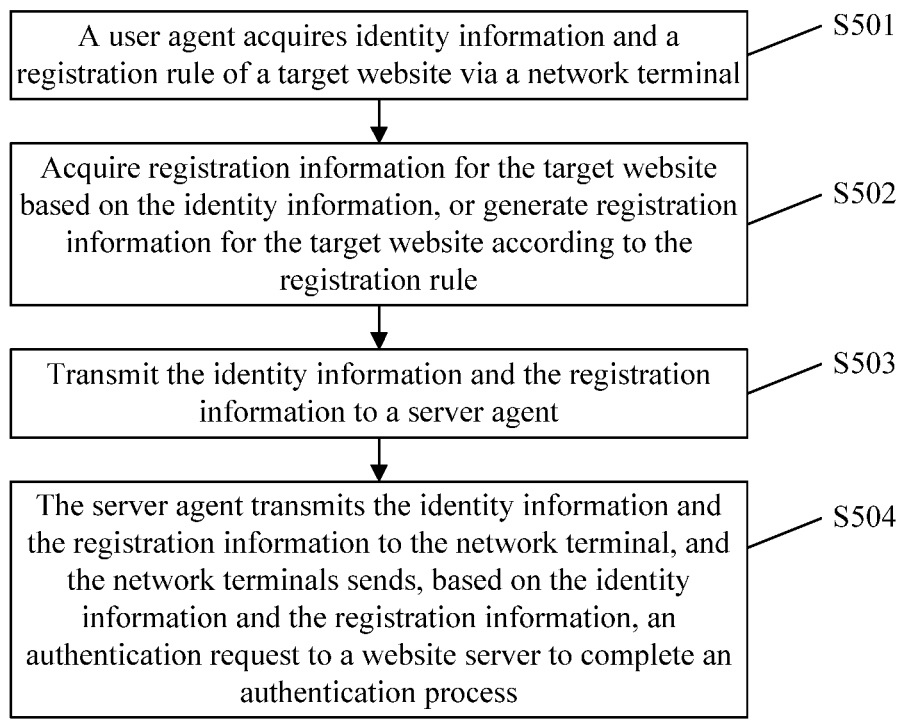
FIG. 5 is a flowchart showing a network identity authentication method according to another embodiment of the present disclosure.

Reference is made to FIG. 5, which is a flowchart showing a network identity authentication method according to another embodiment of the present disclosure. As shown in FIG. 5, the network identity authentication method includes the following steps S501 to S504.

In S501, a user agent acquires identity information and a registration rule of a target website via a network terminal.

In S502, registration information for the target website is acquired based on the identity information, or registration information for the target website is generated according to the registration rule.

In S503, the identity information and the registration information are transmitted to a server agent.

In S504, the server agent transmits the identity information and the registration information to the network terminal, and the network terminal sends, based on the identity information and the registration information, an authentication request to a website server to complete an authentication process.

The server agent may be deployed on the side of the network terminal. In this case, the server agent is required to firstly establish a secure connection with the user agent, and the user agent transmits the identity information of the target website and the registration information for the target website to the server agent via the secure connection. The server agent transmits the identity information of the target website and the registration information for the target website to the network terminal, and the network terminal sends the authentication request to the website server to complete the authentication process.

Figure 6:
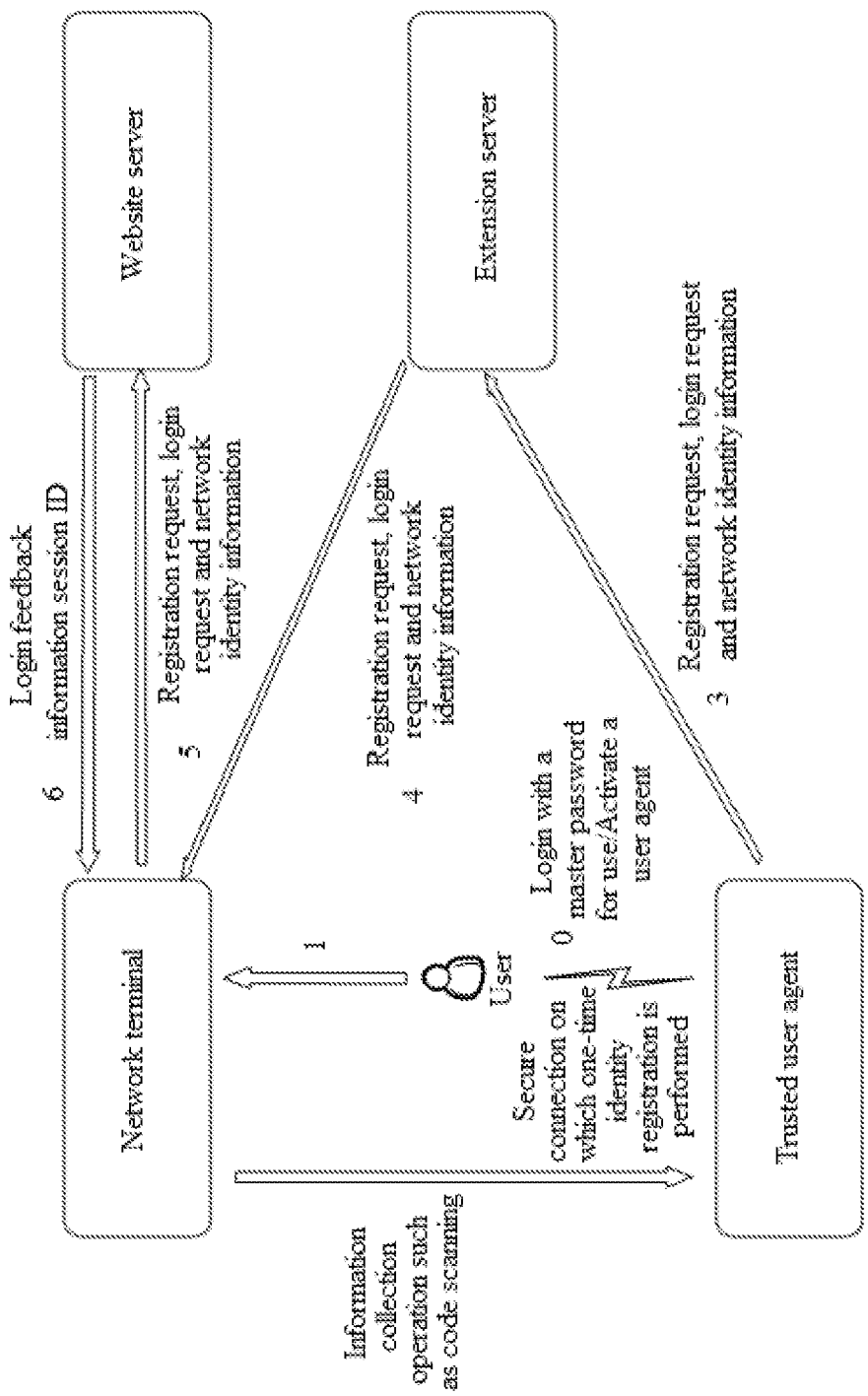
FIG. 6 is a schematic structural diagram showing a third implementation of the network identity authentication method according to the embodiments of the present disclosure.
Figure 7:
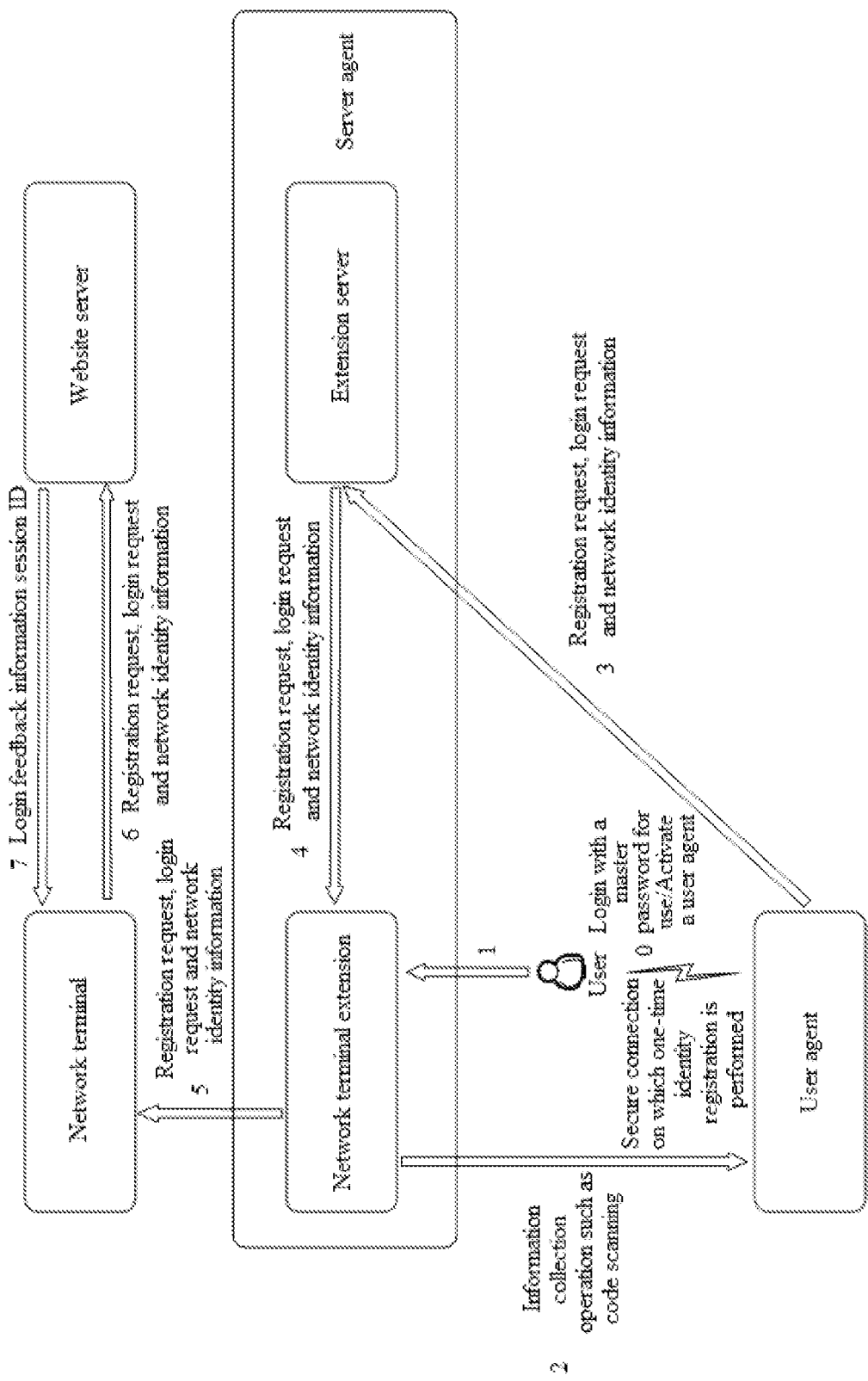
FIG. 7 is a schematic structural diagram showing a fourth implementation of the network identity authentication method according to the embodiments of the present disclosure.

The server agent may be implemented by an extension server. As shown in FIG. 6, the extension server transmits the identity information of the target website and the registration information generated by the user agent directly to the network terminal. The server agent may also be implemented by a combination of an extension server a network terminal extension. As shown in FIG. 7, the user agent transmits the identity information of the target website and the registration information for the target website to the extension server via a secure connection, and the extension server transmits the identity information of the target website and the registration information for the target website to the network terminal extension, and then the network terminal extension transmits the identity information of the target website and the registration information for the target website to the network terminal. It should be noted that all solutions that are easily conceivable for those skilled in the art based on the principle of the present embodiment should fall within the protection scope of the present embodiment.

A network identity authentication system is provided according to an embodiment of the present disclosure. The network identity authentication system described below and the network identity authentication method described above may be referred to each other.

Figure 8:
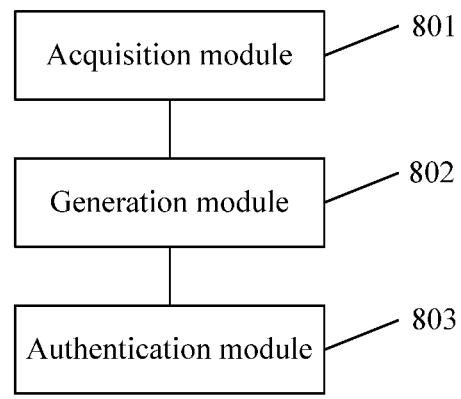
FIG. 8 is a schematic structural diagram showing a network identity authentication system according to an embodiment of the present disclosure.

Reference is made to FIG. 8, which is a schematic structural diagram showing a network identity authentication system according to an embodiment of the present disclosure. As shown in FIG. 8, the network identity authentication system includes an acquisition module 801, a generation module 802, and an authentication module 803.

The acquisition module 801 is configured for a user agent to acquire identity information and a registration rule of a target website via a network terminal.

The generation module 802 is configured to acquire registration information for the target website based on the identity information or generate registration information for the target website according to the registration rule.

The authentication module 803 is configured to transmit the identity information and the registration information to a server agent, so that the server agent sends, based on the identity information and the registration information, an authentication request to a website server to complete an authentication process.

With the network identity authentication system according to the embodiment of the present disclosure, the user agent may automatically generate, for a user, different usernames and passwords for to-be-registered target websites, and the user is not required to remember these usernames and passwords. Further, when the user registers or logs in the target website, the server agent transmits registration information including a username and a password directly to the website server to complete the authentication process, without downloading an application program from the target website, thereby avoiding credential stuffing attacks due to similar usernames and passwords. It can be seen that, with the network identity authentication system according to the embodiment of the present disclosure, security in network identity authentication can be improved without causing the password fatigue.

Based on the above embodiment, in a preferred embodiment, the authentication module is configured for the server agent to the server agent to transmit the identity information and the registration information to the network terminal, so that the network terminal sends, based on the identity information and the registration information, the authentication request to the website server to complete the authentication process.

Based on the above embodiment, in a preferred embodiment, the authentication module is configured for the server agent to transmit the identity information and the registration information directly to the website server to complete the authentication process.

Based on the above embodiment, in a preferred embodiment, the network identity authentication system further includes: a first activating module configured to activate the user agent by inputting a master password for the user agent.

Based on the above embodiment, in a preferred embodiment, the network identity authentication system further includes a second activating module: configured to activate the user agent by inputting a biometric feature.

Based on the above embodiment, in a preferred embodiment, the acquisition module includes a generation unit, a first acquisition unit and a code scanning unit. The generation unit is configured for the server agent to: acquire the identity information and the registration rule based on the target website that is requested to be displayed by the network terminal, and generate a two-dimensional code based on the identity information and the registration rule. The first acquisition unit is configured for the network terminal to: acquire the two-dimensional code from the server agent. The code scanning unit is configured for the user agent to scan the two-dimensional code to establish a secure connection with the server agent, and acquire the identity information and the registration rule of the target website from the server agent via the secure connection.

Based on the above embodiment, in a preferred embodiment, the acquisition module includes an establishing unit, a second acquisition unit, and a transmitting unit. The establishing unit is configured for the user agent to establish a secure connection with the server agent. The second acquisition unit is configured for the server agent to acquire the identity information and the registration rule based on the target website that is requested to be displayed by the network terminal. The transmitting unit is configured for the server agent to: transmit the identity information and the registration rule of the target website to the user agent via the secure connection when a user clicks on a predetermined position in a page displayed on the network terminal.

Based on the above embodiment, in a preferred embodiment, the network identity authentication system further includes a first determining module configured for the user agent to determine whether the target website is a phishing website based on the identity information. If it is determined that the target website is not a phishing website, the generation module is triggered.

Based on the above embodiment, in a preferred embodiment, the network identity authentication system further includes a second determining module configured for the server agent to determine whether a received request including the authentication request is an illegal request or a malicious request. If it is determined that the registration request is neither an illegal request nor a malicious request, the authentication module is triggered.

Based on the above embodiment, in a preferred embodiment, the generation module includes an inquiring unit, a login unit and a registration unit. The inquiring unit is configured to inquire, based on the identity information, whether history registration information for the target website exists in an identity information table. If the history registration information for the target website exists in the identity information table, the login unit is triggered. If no history registration information for the target website exists in the identity information table, the registration unit is triggered. The login unit is configured to determine the history registration information as the registration information for the target website. The registration unit is configured to generate the registration information for the target website according to the registration rule.

Based on the above embodiment, in a preferred embodiment, the network identity authentication system further includes an establishing module, a modification module and a return module. The establishing module is configured for the user agent to: establish a secure connection with the server agent, and acquire via the secure connection, identity information of a to-be-modified website. The modification module is configured for the user agent to: inquire history registration information for the to-be-modified website based on the identity information and modify the history registration information, and send, based on the identity information and the modified registration information, a registration information modifying request to the website server via the server agent. The return module is configured for the website server to: modify registration information for the to-be-modified website based on the modified registration information, and transmit a modifying result to the network terminal.

Figure 9:
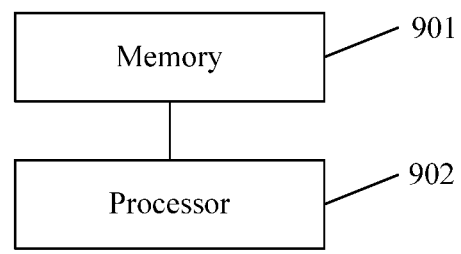
FIG. 9 is a schematic structural diagram showing a user agent device according to an embodiment of the present disclosure.

A user agent device is further provided in the present disclosure. Reference is made to FIG. 9, which is a schematic structural diagram showing a user agent device according to an embodiment of the present disclosure. As shown in FIG. 9, the user agent device includes a memory 901 and a processor 902.

The memory 901 is configured to store a network identity authentication program.

The processor 902 is configured to execute the network identity authentication program to perform the network identity authentication method according to the above embodiments. The user agent device may further include components such as a network interface and a power supply.

With the user agent device according to the present of the present disclosure, the user agent may automatically generate, for a user, different usernames and passwords for to-be-registered target websites, and the user is not required to remember these usernames and passwords. Further, when the user registers or logs in the target website, the server agent transmits registration information including a username and a password directly to the website server to complete the authentication process, without downloading an application program from the target website, thereby avoiding credential stuffing attacks due to similar usernames and passwords. It can be seen that, with the user agent device according to the embodiment of the present disclosure, security in network identity authentication can be improved without causing the password fatigue.

There is further provided a computer-readable storage medium having stored thereon a user agent program in the present disclosure. The user agent program is executed by a processor to implement the steps described in the above embodiments. The storage medium may include: a U-disk, a mobile hard disk, a read-only memory (ROM), a random access memory (RAM), a disk, a disc, or any medium which can store a program code.

Embodiments in this specification are described in a progressive manner, each of the embodiments emphasizes differences from other embodiments, and the same or similar parts among the embodiments can be referred to each other.

Based on the above description of the disclosed embodiments, those skilled in the art can implement or carry out the present disclosure. It is apparent for those skilled in the art to make various modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

Embodiments in this specification are described in a progressive manner, each of the embodiments emphasizes differences from other embodiments, and the same or similar parts among the embodiments can be referred to each other. The system disclosed in the embodiment corresponds to the method disclosed in the embodiment, and is described relatively simply. For detailed description of the system, reference may be made to the related description of the method. It should be noted that improvements and modifications may also be made by those skilled in the art without departing from the principle of the present disclosure. Those improvements and modifications should also be included in the protection scope of the present disclosure.

It should further be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or further includes elements inherent for the process, method, article or device. Unless expressively limited otherwise, the statement "comprising (including) one . . . " does not exclude the case that other similar elements may exist in the process, method, article or device.

The invention claimed is:

1. A network identity authentication method, comprising:
   acquiring, by a user agent, identity information and a registration rule of a target website via a network terminal;
   acquiring registration information for the target website based on the identity information or generating registration information for the target website according to the registration rule;
   transmitting the identity information and the registration information to a server agent; and sending, by the server agent based on the identity information and the registration information, an authentication request to a website server to complete an authentication process;
wherein the acquiring, by a user agent, identity information and a registration rule of a target website via a network terminal comprises:
acquiring the identity information and the registration rule by the server agent based on the target website that is requested to be displayed by the network terminal;
generating a two-dimensional code by the server agent based on the identity information and the registration rule;
acquiring, by the network terminal, the two-dimensional code from the server agent;
scanning, by the user agent, the two-dimensional code to establish a secure connection with the server agent; and
acquiring, by the user agent, the identity information and the registration rule of the target website from the server agent via the secure connection.

2. The network identity authentication method according to claim 1, wherein the sending, by the server agent based on the identity information and the registration information, an authentication request to a website server to complete an authentication process comprises:
in a case that the server agent is deployed on a side of the network terminal,
transmitting, by the server agent, the identity information and the registration information to the network terminal; and
sending, by the network terminal based on the identity information and the registration information, the authentication request to the website server to complete the authentication process.

3. The network identity authentication method according to claim 1, wherein the sending, by the server agent based on the identity information and the registration information, an authentication request to a website server to complete an authentication process comprises:
in a case that the server agent is deployed on a side of the website server,
transmitting, by the server agent, the identity information and the registration information directly to the website server to complete the authentication process.

4. The network identity authentication method according to claim 1, wherein before acquiring, by a user agent, identity information and a registration rule of a target website via a network terminal, the network identity authentication method further comprises:
activating the user agent by inputting a master password for the user agent.

5. The network identity authentication method according to claim 1, wherein before acquiring, by a user agent, identity information and a registration rule of a target website via a network terminal, the network identity authentication method further comprises:
activating the user agent by inputting a biometric feature.

6. The network identity authentication method according to claim 1, wherein the identity information comprises a website address and session information of the target website.

7. The network identity authentication method according to claim 1, wherein the acquiring, by a user agent, identity information and a registration rule of a target website via a network terminal comprises:
establishing, by the user agent, a secure connection with the server agent;
acquiring the identity information and the registration rule by the server agent based on the target website that is requested to be displayed by the network terminal; and
transmitting, by the server agent, the identity information and the registration rule of the target website to the user agent via the secure connection, when a user clicks on a predetermined position in a page displayed on the network terminal.

8. The network identity authentication method according to claim 1, wherein after acquiring, by a user agent, identity information and a registration rule of a target website via a network terminal, the network identity authentication method further comprises:
determining, by the user agent based on the identity information, whether the target website is a phishing website, wherein
if it is determined that the target website is not a phishing website, the step of acquiring registration information for the target website based on the identity information or generating registration information for the target website according to the registration rule is performed.

9. The network identity authentication method according to claim 1, wherein before sending, by the server agent based on the identity information and the registration information, an authentication request to a website server to complete an authentication process, the network identity authentication method further comprises:
determining, by the server agent, whether a received request comprising the authentication request is an illegal request or a malicious request, wherein
if it is determined that the received request is neither an illegal request nor a malicious request, the step of sending, by the server agent based on the identity information and the registration information, an authentication request to a website server to complete an authentication process is performed.

10. The network identity authentication method according to claim 1, wherein the acquiring registration information for the target website based on the identity information or generating registration information for the target website according to the registration rule comprises:
inquiring, based on the identity information, whether history registration information for the target website exists in an identity information table; and
determining the history registration information as the registration information for the target website if the history registration information for the target website exists in the identity information table, or generating the registration information for the target website according to the registration rule if no history registration information for the target website exists in the identity information table.

11. The network identity authentication method according to claim 10, further comprising:
establishing, by the user agent, a secure connection with the server agent;
acquiring, by the user agent via the secure connection, identity information of a to-be-modified website;
inquiring history registration information for the to-be-modified website by the user agent based on the identity information, and modifying the history registration information by the user agent;

sending, by the user agent based on the identity information and the modified registration information, a registration information modifying request to the website server via the server agent; and modifying, by the website server based on the modified registration information, registration information for the to-be-modified website, and transmitting, by the website server, a modifying result to the network terminal.

12. A user agent device, comprising:
a memory configured to store a network identity authentication program; and
a processor configured to execute the network identity authentication program to;
  acquire identity information and a registration rule of a target website;
  acquire registration information for the target website based on the identity information or generate registration information for the target website according to the registration rule; and
  transmit the identity information and the registration information to a server agent;
  wherein the identity information and the registration rule of the target website are acquired by:
    scanning the two-dimensional code obtained from the server agent to establish a secure connection with the server agent; and
    acquiring the identity information and the registration rule of the target website from the server agent via the secure connection.

13. A non-transitory computer-readable storage medium having stored thereon a network identity authentication program that, when executed by a processor, causes the processor to:
  acquire identity information and a registration rule of a target website;
  acquire registration information for the target website based on the identity information or generate registration information for the target website according to the registration rule; and
  transmit the identity information and the registration information to a server agent;
  wherein the identity information and the registration rule of the target website are acquired by:
    scanning the two-dimensional code obtained from the server agent to establish a secure connection with the server agent; and
    acquiring the identity information and the registration rule of the target website from the server agent via the secure connection.

* * * * *